No. 611,753. Patented Oct. 4, 1898.
C. HOSKINS.
FOLDING COOP FOR POULTRY, &c.
(Application filed Nov. 12, 1897.)
(No Model.)
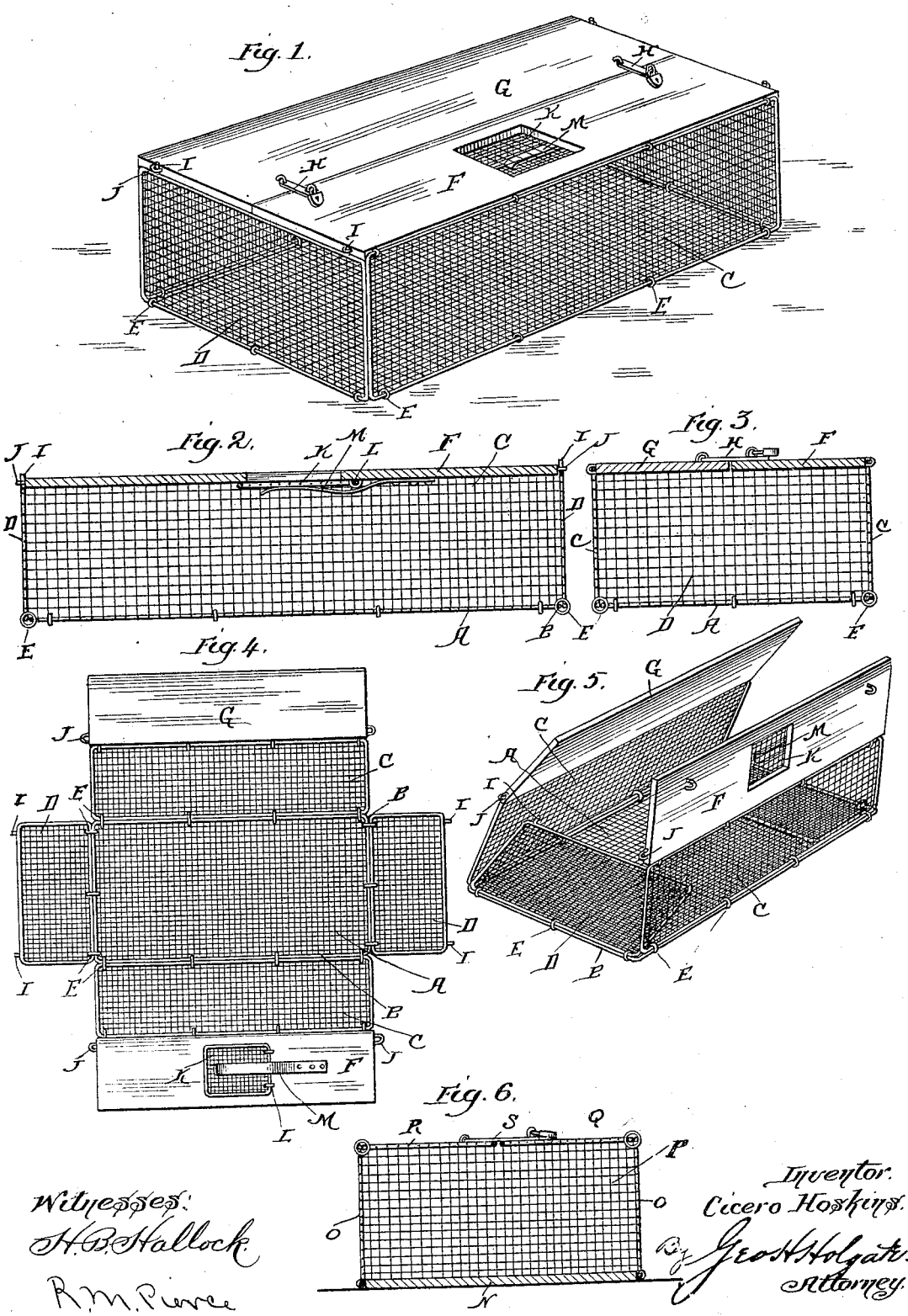
Witnesses:
H. B. Hallock
R. M. Pierce
Inventor.
Cicero Hoskins
By Geo. H. Holgate
Attorney

UNITED STATES PATENT OFFICE.

CICERO HOSKINS, OF PEARL, ILLINOIS.

FOLDING COOP FOR POULTRY, &c.

SPECIFICATION forming part of Letters Patent No. 611,753, dated October 4, 1898.

Application filed November 12, 1897. Serial No. 658,275. (No model.)

*To all whom it may concern:*

Be it known that I, CICERO HOSKINS, a citizen of the United States, residing at Pearl, in the county of Pike and State of Illinois, have invented a certain new and useful Improvement in Folding Coops for Poultry and Fish, of which the following is a specification.

My invention relates to a new and useful improvement in coops for poultry, fish, and the like, and has for its object to provide an exceedingly simple, durable, and effective device of this description, in which live fish may be placed when first caught without the liability of their escape or injury to the same, and which will combine the advantages of a floating box, while at the same time submerging the fish in the water from which they were taken and protecting them from the direct rays of the sun; and a further object of this portion of my invention is to provide means whereby the coop may be completely opened, so as to gain perfect access thereto and its contents; and a still further object of my invention is to provide for the folding of the coop in an exceedingly small space for transportation or storage.

With these ends in view this invention consists in the details of construction and combination of elements hereinafter set forth and then specifically designated by the claim.

In order that those skilled in the art to which this invention appertains may understand how to make and use the same, the construction and operation will now be described in detail, referring to the accompanying drawings, forming a part of this invention, in which—

Figure 1 is a perspective of my improvement in the position to be utilized as a fish-box; Fig. 2, a central longitudinal section thereof; Fig. 3, a cross-section thereof; Fig. 4, a plan view of the device when open; Fig. 5, a perspective showing the manner of folding the device into a small compass, and Fig. 6 an end view illustrating the manner of using the device as a poultry-coop.

In carrying out my invention as here embodied, when to be utilized as a fish-box, I provide a bottom A, which is composed of a rectangular frame B, having suitable wire-netting, preferably galvanized, stretched thereon, and to this bottom is hinged the sides C and ends D by means of the rings or loops E. These ends and sides are made in the same manner as the bottom and when brought into proper position form a completed box with the exception of the top, which latter consists of two boards F and G, which are likewise hinged to the sides and are adapted to swing in position and protect the top by being secured together by the hasps H, which latter may be either latched or locked, as best suits the requirements of the case. Each of the ends of the box is provided with projections I, adapted to pass into the staples J and prevent the displacement of the several parts of the box when adjusted for use.

The section F of the box has an opening therethrough, which is normally closed by a trap-door K, which is hinged at L to the under side of said section, a spring M being thereon, as clearly shown.

In practice when this device is used for fishing purposes it is placed in the water alongside of the boat where the fishing is taking place, and the wire portion thereof will become submerged in the water, while the wooden top will serve as a float and prevent the box from sinking. When the fish are caught, they are inserted within the box by forcing open the trap-door K, after which they will be in the water from which they were taken, yet so caged as to prevent their escape, and the wooden top will also serve to protect the fish thus caged from the undue action of the sun. These combined advantages will preserve the fish for an indefinite length of time, so that they may be in the best condition for transportation or use. Now when it is necessary to remove the fish from the coop this is readily accomplished by placing the latter upon the ground or in the boat, releasing the hasps, and completely opening the box, so as to leave its entire contents exposed to easy access. This last feature is a very important one, since heretofore much inconvenience has been occasioned by having to withdraw the fish from the box through a small opening, often bruising the fish and many times occasioning injury to the hands from catfish and the like.

My improvement also overcomes the disadvantages attendant upon the ordinary folding or stationary box, in which water quickly became heated to an undue degree, thereby injuring or killing the fish and rendering them less desirable for food purposes.

When my improvement is used as a poultry-coop, the bottom consists of a board, while the sides O and ends P are hinged thereto, and the top consists of two sections Q and R, all of which, with the exception of the bottom, are produced of frames having stretched thereon suitable wire-netting, and these sections of the top are secured together in the same manner as that just described by means of the hasps S. The fowls may be placed within the coop through a suitable trap-door; but when they are to be removed therefrom the entire coop may be opened, as before set forth.

One of the principal advantages of my improvement is that when not in use it may be folded into an extremely small compass by turning the ends inward, then swinging the sides thereon, which will also bring the sections of the top in place, so as to make a thin flat package, and, as is well known, this will greatly reduce the cost of shipping as well as storage, since the coop will then fall in the weight class rather in the bulk class.

Another advantage of my improvement is that the coop may be returned to the point of shipping, thus saving the cost of a new coop, which would require a large amount of storage-space; and a still further advantage of my improvement is its durability and the fact that it will not become easily broken or injured and the further fact that its cost of manufacture will be but little, if any, more than coops of ordinary construction.

Having thus fully described my invention, what I claim as new and useful is—

In a device of the character described, a bottom formed of a rectangular wire frame, a netting covering said frame, sides and ends formed similarly to said bottom and hinged to the sides and ends thereof respectively, a top formed of wood, said top being made in two longitudinal sections, a section being hinged to each side, a wire-frame door hinged to the under side of one of said sections to close an opening therein, and a flat spring secured at one end to the same section as the door, the opposite end of the spring bearing against the under side of said door, as and for the purpose described.

In testimony whereof I have hereunto affixed my signature in the presence of two subscribing witnesses.

CICERO HOSKINS.

Witnesses:
P. B. STEPHENS,
W. H. MAYNARD.